United States Patent [19]
Adahan

[11] 3,746,404
[45] July 17, 1973

[54] BRAKE CONTROL DEVICE

[76] Inventor: Carmeli Adahan, 1627 Bonita Avenue, Apt. No. 6, Berkeley, Calif. 94709

[22] Filed: June 1, 1971

[21] Appl. No.: 148,492

[52] U.S. Cl................................ 303/21 F, 303/10
[51] Int. Cl................................................ B60t 8/04
[58] Field of Search..................... 303/21 F, 21 AF, 303/6, 10, 61–63, 68–69; 188/181 A

[56] References Cited
UNITED STATES PATENTS

| | | | |
|---|---|---|---|
| 3,597,012 | 8/1971 | Packer et al. | 303/21 F |
| 3,560,056 | 2/1971 | Stelzer | 303/21 F |
| 3,556,615 | 1/1971 | Stelzer | 303/21 F |
| 3,610,702 | 10/1971 | MacDuff | 303/21 F |

*Primary Examiner*—Duane A. Reger
*Attorney*—Warren P. Kujawa

[57] ABSTRACT

A brake control device for regulating the application of brake fluid pressure to an hydraulic cylinder. An hydraulic flow controller comprising a piston-plunger assembly is alternately controlled by a secondary hydraulic system driven by an available hydraulic source, such as a power steering unit, and an externally mounted solenoid. The secondary hydraulic system incorporates a fail safe system which prevents a failure of fluid pressure in the secondary system from disabling the associated hydraulic braking system.

9 Claims, 2 Drawing Figures

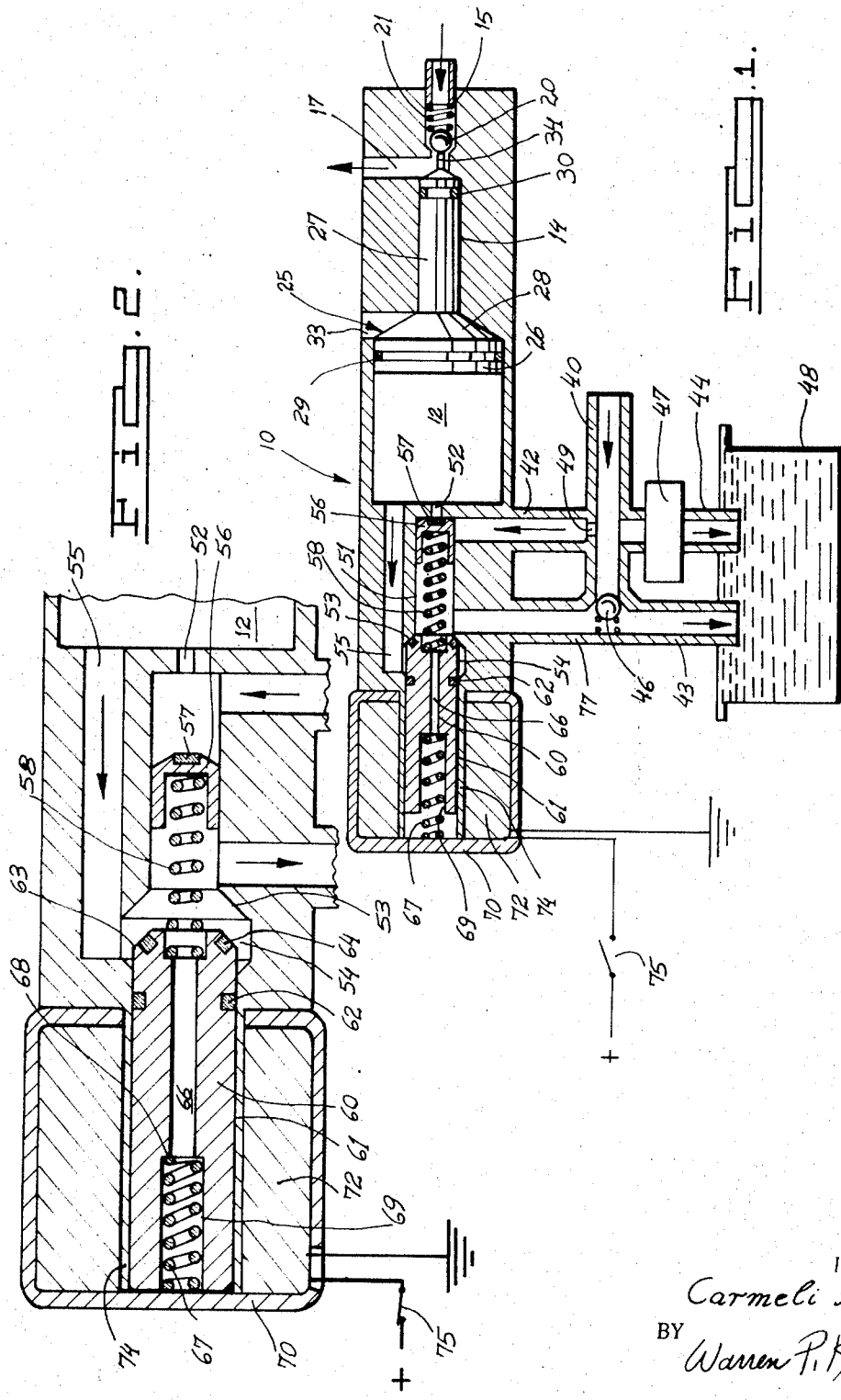

3,746,404

BRAKE CONTROL DEVICE

BACKGROUND OF THE INVENTION

This invention relates to brake control systems for wheeled vehicles, and more particularly to such systems for relieving fluid pressure in the hydraulic line in response to an external control signal.

DESCRIPTION OF THE PRIOR ART

Brake control devices are known which are capable of relieving the fluid pressure in the hydraulic line of a braking system in response to an externally generated signal. Such devices find wide application in skid control systems for preventing wheel lockup due to excessive brake application and resulting vehicle skids. Such a system is disclosed in U.S. Pat. No. 3,066,988 which may be considered representative.

In spite of the diverse models available, skid control systems have not enjoyed wide acceptance on automotive and other wheeled vehicles in the past, primarily due to the combined problems of high cost and low reliability. A major portion of both these problems is directly attributable to the brake control devices employed in such systems.

Many brake control devices employ a large number of working parts, each one of which is subject to ordinary wear. The reliability of such devices is correspondingly low, while their cost of manufacture is inordinately high. Other brake control devices which are responsive to an external control signal employ complicated actuation elements which are customarily installed inside the device. When these elements eventually fail, the task of installing new elements, being quite complex, must be performed by an expert. Still other brake control devices require expensive and cumbersome power sources to drive the working elements.

SUMMARY OF THE INVENTION

The invention disclosed herein comprises a simple brake control device which is compatible with a wide variety of skid control systems, is extremely inexpensive to manufacture and repair, simple in operation and highly reliable in use. In addition, the present invention may be powered by an existing secondary hydraulic source already present on a large number of automobiles.

A piston-plunger assembly is reciprocably mounted in a housing having a piston chamber and a plunger bore, the free end of the plunger being positioned adjacent an hydraulic conduit provided with a spring loaded ball check. A secondary hydraulic system powered by the power steering unit, or some equivalent source, maintains the piston-plunger assembly in a position permitting hydraulic flow through the hydraulic conduit. An externally mounted solenoid coil provides a retracting force for relieving the pressure in the secondary hydraulic system and consequently interrupting hydraulic flow through the hydraulic conduit in response to a brake pressure relief signal. Several safety features are incorporated into the secondary hydraulic system to prevent failure of fluid pressure in the secondary system from disabling the associated hydraulic system.

BRIEF DESCRIPTION OF THE DRAWINGS

FIG. 1 is a sectional view of a preferred embodiment of the invention; and

FIG. 2 is an enlarged sectional view illustrating operation of a portion of the invention of FIG. 1.

DESCRIPTION OF THE PREFERRED EMBODIMENT

In the ensuing description of the preferred embodiment, certain well-known components, such as the master cylinder, the wheel cylinders, and hydraulic conduits, commonly found in hydraulic braking systems for wheeled vehicles have been omitted for clarity. As will be apparent to those skilled in the art, the operation of these elements as well as their method of interconnection with the invention disclosed herein are both well known.

Turning now to the drawings, FIG. 1 illustrates a preferred embodiment of the invention having a housing 10 with a central position chamber 12 and a longitudinally extending bore 14 in communication at one end with chamber 12 and at the opposite end with the junction of an hydraulic inlet bore 15 and an hydraulic outlet bore 17. Inlet bore 15, which is adapted to be coupled to a source of hydraulic fluid pressure such as the master cylinder in an automotive braking system, has a narrowed seat portion 18 and a ball check 20 biased toward seat portion 18 by a spring 21. Outlet bore 17 is adapted to be coupled to a braking device, such as a wheel cylinder in an automobile braking system.

Reciprocably disposed within the housing 10 is a plunger-piston assembly 25 having a piston portion 26, a plunger portion 27 and a tapered interconnecting portion 28. Both piston 26 and plunger 27 are provided with O-rings 29, 30, respectively, or their equivalent and dimensioned to provide a fluid-tight fit with the walls of their respective working chambers, viz. chamber 12 and bore 14. A relief port 33 provides communication with ambient air pressure so that assembly 25 may reciprocate in the horizontal direction. If desired, a mud guard or a dust filter may be installed over port 33 to prevent foreign matter from entering therein.

Extending from the free end of plunger 27 is a valve control tip 34 of a length sufficient to unseat ball check 20 and permit the passage of fluid under pressure in the direction indicated by the arrows when assembly 25 is in the extreme position shown. If assembly 25 is translated to the left from the position shown, tip 34 is retracted and ball check 20 under the influence of spring 21 quickly mates with seat 18, thereby preventing passage of fluid under pressure in the direction shown. The above-described elements thus comprise a device for controlling the application of hydraulic pressure from the master cylinder to the wheel cylinder.

An inlet conduit 40 adapted to be coupled to a suitable source of hydraulic fluid under pressure, which may most conveniently be the pump portion of an automotive power steering unit, communicates with three branches of a secondary hydraulic system: a supply branch 42, a return branch 43, and a bypass 44. Inlet conduit 40 communicates with return branch 43 via spring biased ball check 46 which is designed to maintain a suitable working fluid pressure in conduit 40 when the secondary hydraulic system is required. A pressure of 100 psi has been found to provide excellent results in the preferred embodiment. Inlet conduit 40 communicates with bypass 44 via a relief valve 47 which provides a substantially unrestricted path for the flow of fluid when open. Relief valve 47 ensures that no load is placed on the secondary fluid source when the secondary hydraulic system is not required for the control purpose described below. Relief valve 47 may be controlled by a switch in the master cylinder in such a manner that actuation of the master cylinder closes valve 47, while deactuation of the master cylinder opens valve 47. This may be done in any manner known to those skilled in the art. Both return branch 43 and bypass 44 empty into a fluid reservoir 48, which may most conveniently comprise the reservoir portion of the aforesaid power steering unit.

Inlet conduit 40 is coupled via a metering orifice 49 to supply branch 42, the upper end of which is in communication with a longitudinal bore 51. Bore 51 is in communication with chamber 12 via a metering orifice 52. The opposite end of bore 51 is coupled to the upper end of return branch 43. This same end is also provided with a valve seat 53 in communication with the chamber 54. A fluid relief conduit 55 couples chamber 12 to chamber 54.

Slidably disposed within bore 51 in fluid tight relation with the walls thereof is a safety valve 56. Although not illustrated, valve 56 may be provided with an O-ring similar to O-rings 29, 30. As best shown in FIG. 2, the closed face of valve 56 is provided with a seal 57 having a dimension larger than the diameter of metering orifice 52, for a purpose described below. Valve 56 is normally biased in the direction of metering orifice 52 by a spring 58, the opposite end of which bears on a recessed end surface of a force plunger 60.

Plunger 60 is slidably disposed in a bore 61 and provided with an O-ring 62 to ensure a fluid tight relation with the walls of bore 61. Plunger 60 has a tapered valve surface 63 having a seal 64 for mating with valve seat 53 to isolate chamber 54 from bore 51 when in the FIG. 1 position.

A longitudinal bore 66 is provided in plunger 60 in order to allow fluid pressures on the opposite ends of plunger 60 to equalize during movement of plunger 60 in either direction. Plunger 60 may be constructed of any suitable magnetizable material. Plunger 60 is normally biased in the direction of valve seat 53 by a spring 67 which bears against a shoulder 68 in a recess 69 at one end, and against the inner surface of a cover member 70.

Cover member 70 is disposed about an externally mounted solenoid coil 72 which is mounted on a cylindrical extension 74 of housing 10 in any suitable fashion. Solenoid coil 72 is electrically coupled to a suitable power source by switch 75. As will be evident to those skilled in the art, energization of solenoid coil 72 causes plunger 60 to be quickly attracted into coil 72, i.e., to the configuration illustrated in FIG. 2.

Important to an understanding of the operation of the preferred embodiment is the relative strength or stiffness of springs 58 and 67. Optimally, the springs employed are selected to provide nearly balanced opposing forces when supply branch 42 contains fluid under pressure. As will be seen in the ensuing description, when branch 42 contains pressurized fluid, safety valve 56 assumes a position to the left of that illustrated in FIG. 1. With valve 56 in this position, spring 67 must be strong enough to overcome the force due to partially compressed spring 58. For optimum results, it is most desirable that spring 67 offer little resistance to the movement of plunger 60 to the left when solenoid coil 72 is energized. Thus, spring 67 should provide a slightly greater force urging plunger 60 to the right than the combined forces of the fluid pressure on the face of valve 56 and partially compressed spring 58 urging plunger 60 to the left. As will be apparent to those skilled in the art, the absolute magnitude of the spring constants required for springs 58, 67 will vary with several parameters and may most conveniently be determined in an empirical manner.

The operation of the invention proceeds as follows. Actuation of the secondary hydraulic source causes fluid to be pumped along inlet conduit 40 in the direction of the arrow. So long as the master cylinder in the hydraulic braking system is not actuated, relief valve 47 permits the fluid to flow into reservoir 48. Thus, until the master cylinder is actuated, the secondary hydraulic system puts no load on the secondary hydraulic source.

Once the master cylinder is actuated, valve 47 is closed and pressure quickly builds up in conduit 40 until the predetermined working pressure is obtained. Thereafter, this pressure is maintained by ball check 46, which acts as a pressure regulating valve. It is important to note that the pressure required for the secondary hydraulic system is on the order of 100 psi, while that ordinarily supplied by the pump portion of the power steering unit is substantially higher (usually on the order of 1,000 psi or greater). Thus, when the power steering pump is used as a source for the secondary hydraulic system, the demand load required for this system has a negligible effect on the overall performance of the power steering unit.

Fluid under pressure is metered through orifice 49 into supply branch 42 at a predetermined rate and the fluid pressure on the face of valve 56 quickly overcomes spring 58, forcing valve 56 to the left and exposing metering orifice 52. Subsequently, chamber 12 and then fluid relief conduit 55 are filled with fluid to the working pressure. Since plunger 60 is biased to the right by spring 67, chamber 54 is isolated from return branch 43. With chamber 12 filled with fluid under pressure, piston-plunger assembly 25 is held in the extreme rightward position illustrated in FIG. 1 and tip 34 holds ball check 20 in the unseated position so that fluid under pressure may be transmitted to the wheel cylinder.

When solenoid coil 72 is energized by closing switch 75, plunger 60 is quickly drawn to the left, thereby opening chamber 54. Rapid retraction of plunger 60 is ensured by the balanced interaction between spring 67 and spring 58, and also by longitudinal bore 66. When chamber 54 is vented, the fluid pressure on the left face of piston 26 is quickly relieved, and piston-plunger assembly 25 is rapidly thrust leftwardly by the hydraulic pressure on the free face of plunger 27. Leftward movement of assembly 25 retracts tip 34, thereby permitting ball check 20 to seat, which isolates the wheel cylinder from the master cylinder. Assembly 25 continues to move further to the left until the hydraulic pressure to the wheel cylinder is relieved by the expanding volume presented to the pressurized fluid by bore 14 and the free end of plunger 27. It will be appreciated that the total elapsed time between actuation of solenoid 72 and relief of the brake fluid pressure is extremely short.

When solenoid coil 72 is de-energized by opening switch 75, plunger 60 is thrust to the right by spring 67 to the sealing position shown in FIG. 1. With chamber 54 again isolated from return branch 43, the fluid pressure in chamber 12 again rises and piston assembly 25 is urged to the right. When tip 34 unseats ball check 20, hydraulic brake fluid again flows under pressure from the master cylinder to the wheel cylinder. Successive actuation of solenoid coil 72 proceeds as already described.

The recovery rate of the brake control device, which is the rate at which assembly 25 returns to the position enabling tip 34 to unseat ball check 20, is primarily dependent on the rate at which the fluid in chamber 12 returns to the predetermined working pressure. This rate, in turn, depends primarily on the size of metering orifice 52. If orifice 52 is relatively large, the fluid quickly returns to working pressure; if orifice 52 is relatively small, there is an appreciable time delay before the pressure is attained. The optimum size of orifice 52 may be experimentally determined for any given application. Excessively rapid or slow rates are ordinarily undesirable and should be avoided.

An important safety feature is provided by metering orifice 49. If the secondary supply source should momentarily fail or develop a slight leak, this restrictive orifice prevents a corresponding drop in fluid pressure in conduit 42. Also, if a sudden fluid leak develops downstream from metering orifice 49, this element prevents a corresponding fluid pressure drop in the secondary supply source conduit 40. Thus, the operation of other units which may be coupled in common to conduit 40 is unaffected.

A second important safety feature is provided by safety valve 56. If the secondary supply source should completely fail in such a manner that the pressure in conduit 42 drops substantially below working pressure, spring 58 urges valve 56 to the right until seal 57 blocks metering orifice 52, thereby trapping fluid in chamber 12. This feature prevents the fluid pressure in chamber 12 from falling below the pressure required to maintain assembly 25 in the position for maintaining ball check 20 in the unseated position, thereby ensuring that brake pressure will not be inadvertently relieved in the event of a failure of the secondary source.

A third safety feature may be provided by using a spring 67 which provides a restoring force on plunger 60 greater than the retracting force due to solenoid coil 72 alone. To include this feature, in addition to those considerations described above with regard to the relative strengths of spring 67 and 58, spring 58 should have a stiffness sufficient when compressed by the secondary hydraulic system fluid pressure to overcome the force on plunger 60 due to spring 68 when combined with the retracting force provided by solenoid coil 72.

The above described brake control device is particularly well suited for use in combination with a skid control module, such as that disclosed in my copending application entitled "Acceleration Control Module," Attorney Docket No. 101, filed Oct. 26, 1970. When so employed, solenoid coil 72 is coupled to the output of a skid control signal generator, which produces an energizing signal whenever a braked wheel is on the verge of locking up. It has been found that the rapid secondary pressure release time and the predetermined recovery time afforded by the instant invention, when coupled with the above-noted safety features, provide a highly efficient fail-safe brake control device.

One highly desirable feature of the above-described invention results from the manner of mounting solenoid coil 72. The external mounting arrangement described above enables this coil to be quickly replaced in the event of failure without disassembling the hydraulic components of the device.

Depending on the application, several of the above units may be driven by the same secondary supply source. In such a case, a separate metering orifice 49 and conduit 42, and a separate, shortened return conduit 77 is provided for each unit. Each conduit 77 is coupled to a common return branch 43. Each orifice 49 is coupled to a common inlet conduit 40. In this manner, only one regulating ball check 46 and relief valve 47 need be provided.

In some applications, the demand load required by the secondary hydraulic system may not significantly affect the operation of the secondary supply source. In such a case, relief valve 47 may be omitted in the interest of economy.

While a particular embodiment of the invention has been shown and described, other modifications will be apparent to those skilled in the art. It is therefore not intended that the invention be limited to the disclosed embodiment or details thereof, but only by the appended claims.

What is claimed is:

1. A brake control device comprising:
   a housing having a flow-through passage and a piston chamber;
   a piston-plunger assembly reciprocably mounted in said housing for regulating the flow of fluid through said passage, said chamber being vented at the plunger side of said piston;
   secondary fluid means including a secondary fluid supply means coupled to said assembly for maintaining said assembly in a first position permitting said flow by the application of fluid pressure to said assembly, said secondary fluid means including a metering orifice coupled between said chamber and said secondary fluid supply means, a return conduit having an outlet, and means for closing said outlet;
   signal responsive means for relieving said fluid pressure to permit said assembly to move in a direction away from said first position; and
   safety means for maintaining said application of said fluid pressure in response to a drop in fluid pressure in said supply means, said safety means including a bias valve slidably positioned in said secondary fluid means adjacent said metering orifice and biased theretoward, said valve being normally maintained in a nonsealing position by said fluid pressure.

2. The apparatus of claim 1 wherein said flow-through passage is provided with a normally closed valve means for preventing said flow, and said assembly includes a means for holding said valve in an open configuration when said assembly is in said first position.

3. The apparatus of claim 2 wherein said holding means comprises a tip of reduced diameter on the free end of said plunger.

4. The apparatus of claim 1 wherein said fluid supply means comprises a supply conduit coupled to said housing, a source of pressurized fluid, a metering orifice coupled between said source and said conduit, a reservoir, and a regulating valve coupled between said source and said reservoir.

5. The apparatus of claim 4 wherein said source of pressurized fluid comprises a power steering unit pressure pump.

6. The apparatus of claim 4 further including a signal responsive bypass valve coupled between said source and said reservoir.

7. The apparatus of claim 1 wherein said means for closing said outlet comprises a sealing member located on a spring biased plunger.

8. The apparatus of claim 7 wherein said signal responsive means comprises an externally mounted solenoid coil positioned adjacent one end of said housing and said spring biased plunger, said plunger being constructed of a magnetizable material.

9. The apparatus of claim 7 wherein said safety means comprises a safety valve located in said secondary fluid means in a position adjacent said metering orifice, a bias means coupled to one end of said valve and to the sealing member end of said magnetizable plunger, said bias means providing a force in the direction of said orifice less than that provided in a generally opposite direction by said fluid pressure so that said safety valve is normally maintained in a nonsealing position, said bias means providing a force assisting said solenoid coil for retracting said plunger.

* * * * *